(No Model.)

O. R. MEHAFFEY.
COUPLING FOR PUMP RODS.

No. 275,065. Patented Apr. 3, 1883.

WITNESSES:
J. D. Garfield
C. Sedgwick

INVENTOR:
O. R. Mehaffey
BY Munn & Co.
ATTORNEYS.

N. PETERS. Photo-Lithographer, Washington, D. C.

UNITED STATES PATENT OFFICE.

OLIVER R. MEHAFFEY, OF RICHBURG, NEW YORK.

COUPLING FOR PUMP-RODS.

SPECIFICATION forming part of Letters Patent No. 275,065, dated April 3, 1883.

Application filed January 26, 1883. (No model.)

*To all whom it may concern:*

Be it known that I, OLIVER R. MEHAFFEY, of Richburg, in the county of Allegany and State of New York, have invented a new and Improved Coupling for Pump-Rods, of which the following is a full, clear, and exact description.

The object of my invention is to provide a new and improved coupling for the sucker-rods of pumps, by means of which coupling the rod-sections can be coupled and uncoupled very easily and rapidly.

The invention consists in a rod-coupling formed of a recessed or notched tenon on one end of a rod, and a socket provided with a spring-latch on the other end, whereby if the tenon of one rod is passed into the socket of the other the rods will be coupled, the spring-latch in the socket catching on the shoulder on the tenon.

The invention also consists in parts and combinations of the same, all as will be fully described hereinafter.

Reference is to be had to the accompanying drawings, forming a part of this specification, in which similar letters of reference indicate corresponding parts in all the figures.

Figure 1:
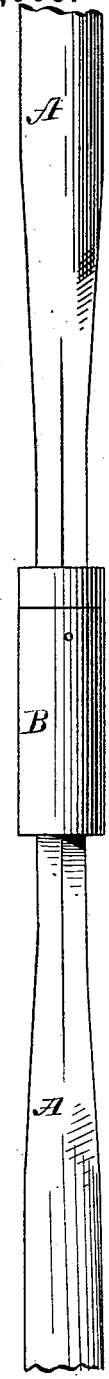
Figure 2:
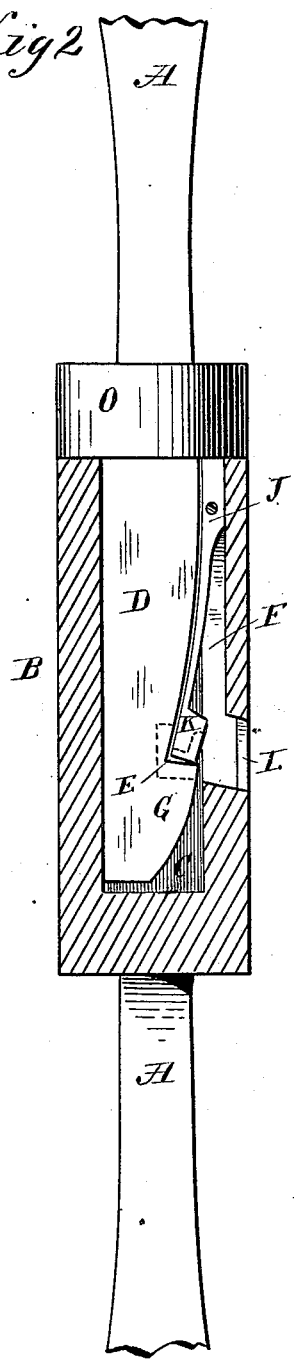
Figure 3:
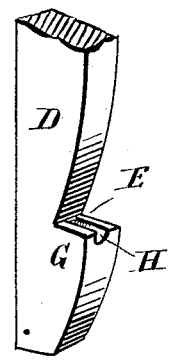
Figure 4:
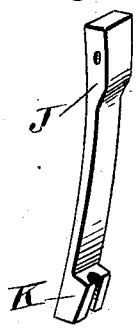
Figure 5:

Figure 1 shows the ends of two rods united by means of my improved coupling. Fig. 2 is a longitudinal sectional elevation of the coupling. Fig. 3 is a perspective view of the tenon formed at one end of each rod. Fig. 4 is a perspective view of the spring-latch. Fig. 5 is a perspective view of the key for releasing the same.

To one end of each rod-section A a cast-iron socket, B, provided with a longitudinal opening or recess, C, is attached, and to the opposite end of each rod-section A a tenon, D, is attached, which fits within the opening or recess C in the socket. The free end of the tenon is rounded or beveled, and on one longitudinal side the tenon is provided with a recess, E, forming a shoulder, G, which is provided with a longitudinal groove, H. A spring-latch, J, is fastened at one end in the upper end of a longitudinal groove, F, in the inner surface of the socket. The lower end of the spring-latch, which is provided with a head, K, is pressed toward the interior of the socket. The head K is provided with a groove on the side nearest the outer surface of the socket and with a transverse groove in the end. The socket B is provided with a slot or recess, L, opposite the lower end of the spring-latch, J. A key, M, for withdrawing the latch-spring is provided at its end with a crook or bend, N. The tenon B is provided at its inner or base end with a collar, O, which fits closely on the outer or open end of the socket B. If the tenon D is passed into a socket, B, the beveled or rounded end of the said tenon presses the spring-latch J into the groove F until the shoulder G has passed below the head at the free end of the latch-spring, which then snaps outward over the said shoulder, and thus prevents a withdrawal of the tenon, and whereby the two rod-sections will be coupled. If two rod-sections are to be uncoupled, the key M is passed through the opening or slot L in the socket B, and the crook N of the key is passed through the groove H, and the groove in the end of the head K of the spring, so that the said crook passes in behind the head K. Then by pulling on the key the head K will be drawn into the groove F, thus permitting the tenon to be withdrawn.

In place of the key $m$, a wire hook or an analogous device can be used.

Having thus fully described my invention, I claim as new and desire to secure by Letters Patent—

1. The combination, with a pump-rod, of a socket attached to one end, a recessed or notched tenon at the other end, and a latch-spring secured on the socket, substantially as herein shown and described, and for the purpose set forth.

2. The combination, with the pump-rods A, of the socket B, the tenon D, provided with a notch or recess, E, the latch-spring J, and the collar O, substantially as herein shown and described, and for the purpose set forth.

3. The combination, with the pump-rods A, of the socket B, provided with an aperture or slot, L, the notched or recessed tenon D, and the spring-latch J, substantially as herein shown and described, and for the purpose set forth.

4. The combination, with the pump-rods A, of the socket B, provided with a slot or aperture, L, the notched or recessed tenon D, and the spring-latch J, having a head, K, provided with a groove in the end and in one side, substantially as herein shown and described, and for the purpose set forth.

5. The combination, with the pump-rods A, of the socket B, the tenon D, provided with a recess or notch, E, forming a shoulder, G, which is provided with a groove, H, and of the spring-latch J, substantially as herein shown and described, and for the purpose set forth.

OLIVER R. MEHAFFEY.

Witnesses:
S. E. PETERS,
W. H. PETERS.